US009776607B2

(12) United States Patent
Brenn et al.

(10) Patent No.: US 9,776,607 B2
(45) Date of Patent: Oct. 3, 2017

(54) FAULT-TOLERANT REDUNDANT BY-WIRE BRAKE SYSTEM

(71) Applicant: Continental Automotive Systems, Inc., Auburn Hills, MI (US)

(72) Inventors: Martin Brenn, Mainz (DE); Geoffrey Burke Bauer, Oxford, MI (US); Jeremy J McClain, Oxford, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/006,420

(22) Filed: Jan. 26, 2016

(65) Prior Publication Data

US 2016/0214582 A1 Jul. 28, 2016

Related U.S. Application Data

(60) Provisional application No. 62/108,691, filed on Jan. 28, 2015.

(51) Int. Cl.
*B60T 7/12* (2006.01)
*B60T 8/171* (2006.01)
(Continued)

(52) U.S. Cl.
CPC .............. *B60T 7/12* (2013.01); *B60T 7/042* (2013.01); *B60T 8/321* (2013.01); *B60T 8/326* (2013.01);
(Continued)

(58) Field of Classification Search
CPC ...... B60T 7/12; B60T 7/042; B60T 2270/413; B60T 8/321; B60T 8/326; B60T 13/662
(Continued)

(56) References Cited

U.S. PATENT DOCUMENTS

5,984,429 A * 11/1999 Nell ................. B60T 7/042
303/113.4
6,305,506 B1 * 10/2001 Shirai .............. B60T 7/042
188/136
(Continued)

*Primary Examiner* — Atul Trivedi (57) ABSTRACT

A brake system for a motor vehicle comprises a first brake set and second brake set. A first hydraulic brake circuit is connected to the first brake set and a second hydraulic brake circuit is connected to the second brake set. Further, a first control module is coupled to the first hydraulic brake circuit and the second hydraulic brake circuit. The first control module is configured to control fluid pressure within both the first hydraulic brake circuit and the second hydraulic brake circuit. A second control module is also coupled to the first hydraulic brake circuit and the second hydraulic brake circuit. The second control module is configured to control fluid pressure within both the first hydraulic brake circuit and the second hydraulic brake circuit independent of the first control module. The first control module is disposed in series with the second control module in the first and the second hydraulic brake circuits. Additionally, a virtual driver sends a deceleration request to the first control module and the second control module. The first control module and the second control module determine a desired pressure based upon the deceleration request. The first brake control module controls fluid pressure within both the first and the second hydraulic brake circuits to perform the deceleration request. The second control module monitors pressure downstream from the first control module and compares the monitored pressure to the desired pressure.

19 Claims, 3 Drawing Sheets

(51) Int. Cl.
*B60T 7/04* (2006.01)
*B60T 13/66* (2006.01)
*B60T 8/32* (2006.01)

(52) U.S. Cl.
CPC ....... *B60T 13/662* (2013.01); *B60T 2270/413* (2013.01)

(58) Field of Classification Search
USPC .......................................................... 701/70
See application file for complete search history.

(56) References Cited

U.S. PATENT DOCUMENTS

| | | | | |
|---|---|---|---|---|
| 6,837,552 B2* | 1/2005 | Reuter | ................... | B60T 7/042 303/122.09 |
| 2002/0029943 A1* | 3/2002 | Totsuka | ................... | B60T 7/122 188/113 |
| 2008/0185235 A1* | 8/2008 | Suzuki | ................... | B60T 7/042 188/1.11 E |
| 2010/0062897 A1* | 3/2010 | Nishino | ................... | B60T 1/10 477/29 |
| 2010/0292049 A1* | 11/2010 | Petersson | ................ | B60T 10/00 477/188 |
| 2012/0245815 A1* | 9/2012 | Schneider | ............... | B60T 7/107 701/70 |
| 2014/0305751 A1* | 10/2014 | Yamamoto | ................. | B60T 8/00 188/72.4 |
| 2014/0345986 A1* | 11/2014 | Foitzik | ..................... | B60T 7/12 188/106 P |

* cited by examiner

FIG.3

FAULT-TOLERANT REDUNDANT BY-WIRE BRAKE SYSTEM

CROSS REFERENCE TO RELATED APPLICATION BACKGROUND

This application claims priority to U.S. Provisional Application No. 62/108,691 filed on Jan. 28, 2015.

BACKGROUND

This disclosure generally relates to a braking system for a motor vehicle. More particularly, this disclosure relates to an autonomous fully by-wire braking system for a motor vehicle.

Braking systems for a motor vehicle generally include a hydraulic circuit that actuates wheel cylinders to impart braking torque. Conventional braking systems are actuated responsive to action by a vehicle operator. Advanced vehicle systems integrate various levels of autonomous control to actuate systems independent of operator inputs. Such autonomous systems utilize information indicative of vehicle speed, acceleration, direction, and location as a prompt to engage vehicle systems without or in addition to input from a vehicle operator. Autonomous actuation of a vehicle braking system is prompted based on predetermined algorithms and triggers from various vehicle sensors.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An air spring for air suspension system comprises a piston assembly and a damper assembly where the piston assembly is spaced apart from the damper assembly to at least partially define an air chamber. A seal is molded with piston walls to form an integrated piston assembly. The seal includes at least one sealing lip extending radially inward from the piston assembly at an angle that is non-perpendicular to an axis of the damper and the at least one sealing lip contacts the damper assembly when the piston assembly and the damper assembly are assembled together to seal the air chamber.

A brake system for a motor vehicle comprises a first brake set and second brake set. A first hydraulic brake circuit is connected to the first brake set and a second hydraulic brake circuit is connected to the second brake set. Further, a first control module is coupled to the first hydraulic brake circuit and the second hydraulic brake circuit. The first control module is configured to control fluid pressure within both the first hydraulic brake circuit and the second hydraulic brake circuit. A second control module is also coupled to the first hydraulic brake circuit and the second hydraulic brake circuit. The second control module is configured to control fluid pressure within both the first hydraulic brake circuit and the second hydraulic brake circuit independent of the first control module. The first control module is disposed in series with the second control module in the first and the second hydraulic brake circuits. Additionally, a virtual driver sends a deceleration request to the first control module and the second control module. The first control module and the second control module determine a desired pressure based upon the deceleration request. The first brake control module controls fluid pressure within both the first and the second hydraulic brake circuits to perform the deceleration request. The second control module monitors pressure downstream from the first control module and compares the monitored pressure to the desired pressure.

A brake system for a motor vehicle comprises a first brake set and second brake set. A first brake circuit is connected to the first brake set and a second brake circuit is connected to the second brake set. Further, a first control module is coupled to the first hydraulic brake circuit and the second hydraulic brake circuit. The first control module is configured to control both the first brake circuit and the second brake circuit. A second control module is also coupled to the first brake circuit and the second brake circuit. The second control module is configured to control both the first brake circuit and the second brake circuit independent of the first control module. The first control module is disposed in series with the second control module in the first and the second brake circuits. Additionally, a virtual driver sends a deceleration request to the first control module and the second control module. The first control module and the second control module determine a desired braking pressure based upon the deceleration request. The first brake control module controls the first and the second brake circuits to perform the deceleration request. The second control module monitors the performed deceleration and compares the performed deceleration to deceleration request. The first second control modules are each one of: a hydraulic control module and an electro-mechanical brake actuator.

A method of operating a vehicle braking system comprises configuring a first control module coupled to control both a first brake circuit and a second brake circuit and configuring a second control module disposed in series with the first control module to control both the first brake circuit and the second brake circuit. A deceleration request is sent from a virtual driver to the first control module and the second control module and both the first hydraulic brake circuit and the second hydraulic brake circuit are controlled with the first control module to perform the deceleration request. The performed deceleration request is monitored from the first control module with the second control module and the performed deceleration request is compared to the actual deceleration request with the second control module. Both the first brake circuit and the hydraulic brake circuit are controlled with the second control module when a difference in the performed deceleration request and the actual deceleration request is above a predetermined threshold.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
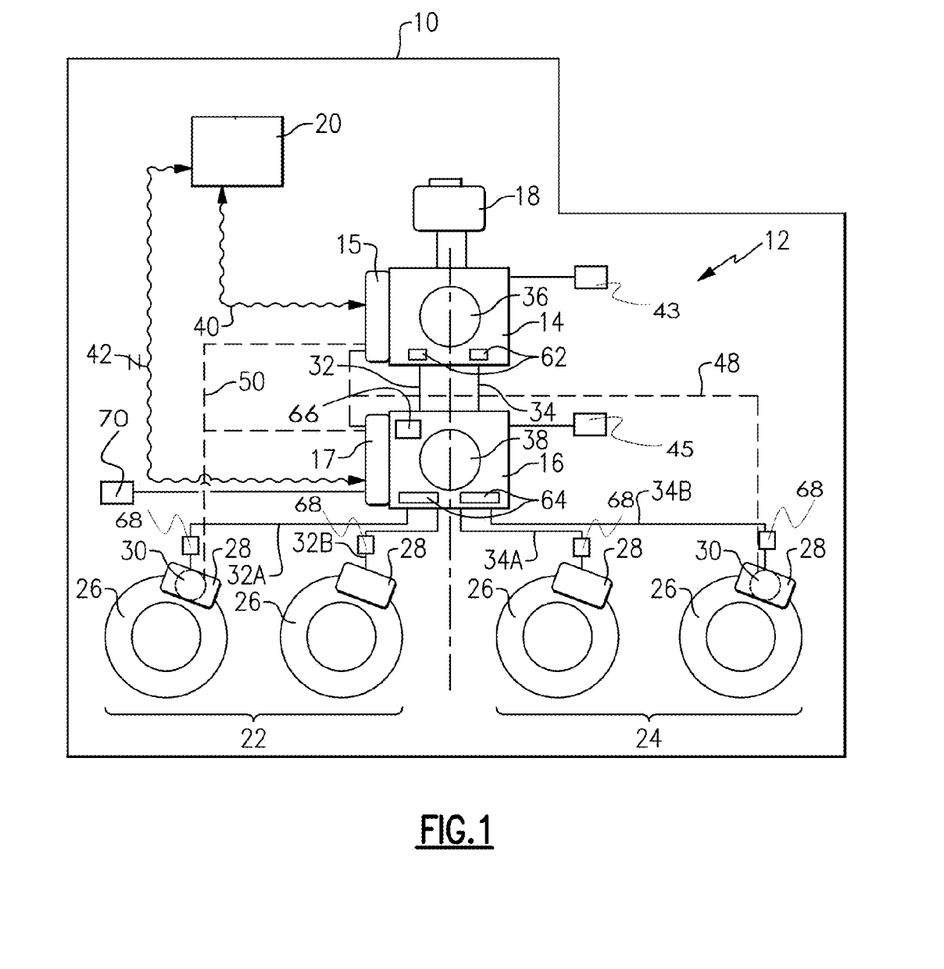
FIG. 1 is a schematic view of an example vehicle braking system.

Referring to FIG. 1, a by-wire braking system 12 for a motor vehicle 10 (Shown schematically) includes independent brake control modules (BCM) that each are configured to provide braking pressure within a first brake circuit 22 and a second brake circuit 24. The disclosed system 12 may provide a fully by-wire braking system controlled by a virtual driver 20 independent or in combination with input from a vehicle operator.

The example braking system 12, includes a first or Upstream Brake Control Module 14 (UBCM) and a second or Downstream Brake Control Module 16 (DBCM). Each of the UBCM 14 and the DBCM 16 work hydraulically in series to provide hydraulic brake pressure and vehicle stability functions. The brake system 12 provides redundant hardware and software to ensure base braking performance in the presence of single point failures and without any mechanical interface to the driver.

The UBCM 14 and DBCM 16 work independently of one another to build hydraulic brake pressure. The UBCM 14 and DBCM 16 are plumbed hydraulically in series with one another. The disclosed brake system 12 includes a reservoir 18 that provides brake fluid to the first brake circuit 22 and the second brake circuit 24. The example reservoir 18 contains two fluid chambers (one for each hydraulic circuit 22 and 24) or may also be configured as two independent reservoirs.

A wheel brake 28 is disposed at each wheel of the vehicle and actuates against a rotor 26. In this disclosed example, the wheel brake 28 is a caliper that exerts a braking torque on the rotor 26. It should be understood that other wheel brake configurations may also be utilized within the contemplation of the disclosed brake system 12.

The UBCM 14 includes a first pump 36 and the DBCM 16 includes a second pump 38 that are controlled to provide the desired pressure to control activation of wheel brakes 28. Each of the first pump 36 and the second pump 38 are hydraulically coupled by valves 62, 64 to each of the hydraulic circuits 22, 24 that enable hydraulic flow with each hydraulic circuit 22, 24 independently and/or in any desired combination. Pressure increases and control are the result of an activation of a corresponding one of the first and second pumps 36, 38. The UBCM 14 is disposed upstream of the DBCM 16 within each of the first and second brake circuits 22, 24. Brake fluid is provided by the reservoir 18 to both the brake circuits 22, 24 and flows through the UBCM 14 to the DBCM 16 such that the UBCM 14 pushes brake fluid through the DBCM 16 when hydraulic pressure control is provided by the UBCM 14 and the DBCM 16 draws fluid through the UBCM 14 when the DBCM 14 is providing hydraulic pressure control. The fluid reservoir 18 may also be arranged such that each of the DBCM 16 and the UBCM 14 draw fluid directly from the fluid reservoir 18, separate and independent of each other. The brake system 12 may have other configurations for fluid control with the UBCM 14 and the DBCM 16 may also be utilized, eg. UBCM 14 and the DBCM 16 are partially in series for only one axles. One skilled in the art would be able to determine the configuration for the UBCM 14 and the DBCM 16 which is most beneficial for a particular brake system 12 and vehicle 10 configuration and needs.

The UBCM 14 contains at least one electronic control unit (ECU) 15, an electrical power supply, one or more data connections or analog/digital inputs/outputs 40, at least one hydraulic pump 36 and multiple electromechanical hydraulic valves 62 for each of two hydraulic circuits 22, 24. The hydraulic path through the UBCM 14 is normally open.

The DBCM 16 contains at least one ECU 17, an electrical power supply, one or more data connections or analog/digital inputs/outputs 42, at least one hydraulic pump 38 and multiple electromechanical hydraulic valves 64 for each of four hydraulic lines 32a, 32b, 34a and 34b circuits which are connected to the wheel brakes 28. The hydraulic path through the DBCM 16 is normally open.

An electronic Integrated Parking Brake (eIPB) caliper 30 is provided with at least one of the wheel brakes 28. In this example an eIPB caliper 30 is provided in each of the first and second brake circuits 22, 24. The eIPB calipers 30 electromechanically apply and lock to hold brake torque in the wheel brake 28 for parking situations. The eIPBs 30 may also be used in hydraulic failure situations to apply brake torque independent from the first and second hydraulic circuits 22, 24.

Both the UBCM 14 and the DBCM 16 of the brake system 12 are in communication with the corresponding eIPBs 30 through a first communication link 50 and a second communication link 48. Accordingly, each of the UBCM 14 and the DBCM 16 are capable of controlling the eIPBs 30 independently from one another. The example eIPBs 30 are configured as "normally open" such that in the absence of electric actuation, the eIPBs 30 do not apply a brake torque to the corresponding wheel. Alternatively, only one of the UBCM 14 and the DBCM 16 may be able to control the eIPB 30.

The UBCM 14 has a first power source 43 and the DBCM 16 has a second power source 45. The first power source 43 and the second power source 45 are independent from one another. Each of the UBCM 14 and the DBCM 16 are in independent electrical and data communication with a virtual driver 20. The UBCM 14 communicates through a first data interface 40 with the virtual driver 20. The DBCM 16 communicates through a second data interface 42 with the virtual driver 20. The example virtual driver 20 can be part of the vehicle control module or a separate control module for operation of the brake system 12. Information indicative of vehicle operations utilized for determination of proper brake actuation operation is provided to the virtual driver 20. The virtual driver 20 utilizes the information indicative of vehicle operation to determine suitable and desired braking actuation to be implemented by the UBCM 14, and DBCM 16 to determine suitable and desired braking actuation. Moreover, the virtual driver 20 may provide specific commands that are required to implement a desired braking operation.

The virtual driver 20 uses higher-level logic to determine the deceleration or pressure/torque request which is then sent to both the UBCM 14 and the DBCM 16 to ensure execution of the request. In particular the virtual driver 20 calculates the necessity of a brake request by monitoring the surroundings of the vehicle 10 with sensors and the known intended navigation path of the driver.

The brake request is sent over the two independent communication channels 40, 42 so each of the UBCM 14 and the DBCM 16 are aware of the target brake torque or target deceleration to be applied to the vehicle 10. Each request contains the needed brake torque or needed vehicle deceleration, dependent on the interface type between virtual driver 20 and brake system 12.

Each brake control unit 14, 16 reports the successful reception of the message by repeating the message back to the virtual driver 20. If the virtual driver 20 detects a deviation within a certain time window, the corresponding unit 14, 16 should be considered as non-available by the virtual driver 20. The DBCM 16 will ignore the brake torque request until the DBCM 16 has estimated a loss of UBCM 14 or unless the DBCM 16 was explicitly selected by the virtual driver 20.

To improve the detection of non-availability of the UBCM 14, the DBCM 16 sends certain control frames to the UBCM 14 via a private bus or gatewayed by the vehicle network to other unit. The UBCM 14 needs to acknowledge the content by giving the appropriate response, e.g. Challenge/Response. If the response is not acknowledged within a certain timeframe, the DBCM 16 will consider the UBCM 14 as not available and immediately execute the virtual driver's 20 brake request. Additionally, the DBCM 16 has or is connected to a pressure sensor 66. The pressure sensor 66 is downstream from the UBCM 14 and is, therefore, able to sense pressure within the brake system 12 which results from any change that is activated by the UBCM 16. As an additional detection measure, the DBCM 16 performs a comparison of the brake torque request from the virtual driver 20 to the brake pressure being measured at one or both of the hydraulic circuits at the DBCM 16, by the pressure sensor 66. If the brake pressure measured by the pressure sensor 66 does not match the pressure required for the torque request from the virtual driver 20 than the DBCM 16 will determine the UBCM 14 is not available and the DCBM 16 performs the torque request which was received from the virtual driver 20. Each brake control module 14, 16 in modern brake systems 12 with stabilization control like ABS or ESC already have such a brake pressure sensor to estimate the driver's applied brake pressure. This sensor may be used as pressure sensor 66 for plausibilisation in the braking system 12 for autonomous driving.

In further details, when the virtual driver 20 performs a request via a brake torque interface 40 and 42, the brake torque is translated separately by the ECUs 15 and 17 for each of the UBCM 14 and by the DCBM 16 to an estimated brake pressure by a torque/pressure transformation. The ECU 17 for the DCBM 16 compares expected brake pressure calculated from the translated brake torque to a measured pressure by the sensor 66. If the measured brake pressure does not match to the expected brake pressure, within a certain acceptance frame considering time and accuracy of the values, the DBCM 16 assumes the non-availability of the UBCM 14 and starts to actuate to build up the required brake pressure. The brake pressure control may be an open loop control or a closed loop control with pressure feedback. The assumption of loss of the UBCM 14 is also reported the virtual driver 20 which may perform appropriate action in case of loss of redundancy.

In further detail, when the virtual driver 20 performs requests via a vehicle deceleration interface, the vehicle deceleration is translated to an estimated brake pressure by considering the current vehicle deceleration, current brake pressure, road grade information and current engine torque (regeneration interface) as reported by the vehicle network. Like for the brake torque interface 40 and 42, the DCBM 16 starts to actuate in case of deviations and reports to the virtual driver 20. The vehicle deceleration control is applied as a closed loop control with vehicle acceleration feedback.

As an additional measure, the DBCM 16 may perform a plausibilisation of the requested vehicle deceleration with the actual vehicle deceleration. The actual vehicle deceleration can be estimated out of the connected wheel speed sensors 68 or via the vehicle network and other vehicle motion data sources, such as an external longitudinal acceleration sensor 70 being hosted by an inertial measurement unit (IMU). When the actual vehicle deceleration does not match with the requested vehicle deceleration, within certain time and accuracy thresholds, the DBCM 16 assumes the non-availability of the UBCM 14 and will execute the brake request. It will also inform the virtual driver 20 about the loss of redundancy.

When the virtual driver 20 performs an explicit hold/standstill command, the DBCM 16 monitors the vehicle movement by checking wheel ticks on the wheel speed sensors 68 and/or using another information source, e.g sensor 70, about vehicle movement.

When the vehicle 10 is considered as moving and the virtual driver 20 requests an explicit hold/standstill command, the DBCM 16 considers the UBCM 14 as not available when a certain time window has elapsed and the corresponding pressure change, or other changes, are not detected by one of the sensors 66, 68, 70. The time window for detecting response by the UBCM 14 must be sufficient to allow for an increase in brake pressure. For example, the time window must be sufficient to allow for a decrease in sufficiency of the brake force of the calipers due to time effects like cool down of brake system 12 or change of vehicle weight. When the pressure changes, or any of the other changes are detected the DBCM 16 will than assume actuation of the brake system 12. That is, the DBCM 16 will execute the brake hold/standstill request once movement is detected.

When the UBCM 14 includes an ABS-like function, which might decrease brake pressure on purpose, and DBCM 16 monitors the brake pressure and the UBCM 14 can: inform the DBCM 16 about active ABS intervention; or directly tell the DBCM 16 about the intended brake pressure at the outlets 36. As such, the DBCM 16 can modify its monitoring to avoid unnecessary activation of the DBCM 16, which will interfere with the ABS intervention.

When the DBCM 16 determines a loss of the UBCM 16, the DBCM 16 informs the virtual driver 20, so the virtual driver 20 can trigger a transition to a safe state driven by the loss of redundancy.

In an another embodiment, an additional ECU may be used to monitor and compare the expected brake pressure to the actual brake pressure and determine whether the UBCM 14 or the DBCM 16 should be used. Alternately, the DBCM 16 may be the default control module for brake 28 activation. An additional pressure sensor may be placed downstream of the DBCM 16 to allow the UBCM 14 monitor and compare the expected brake pressure to the actual brake pressure.

Further explanation of the brake system 12 for application of the brakes 28 by the UBCM 14, DCBM 16 is explained in detail below. Each of the UBCM 14 and the DBCM 16 are hydraulically coupled to the first and second hydraulic circuits 22, 24. The first hydraulic circuit 22 includes hydraulic line 32 that provides a fluid passage from the reservoir 18 through the UBCM 14 and through the DBCM 16. The line 32 then splits into separate lines 32A and 32B to corresponding wheel brakes 28. The second hydraulic circuit 24 includes hydraulic line 34 that transfers brake fluid from the reservoir 18 to and through the UBCM 14 through the DBCM 16. In another configuration of the system the hydraulic connection through the DBCM 16 may connect only two wheel brakes 28 (one on each circuit) and the other two wheel brakes 28 may be connected only to the UBCM 14. In such cases, the wheel brakes 28 connected to the UBCM 14 would be the eIPB calipers 30 to enable electromechanical braking in case of UBCM 14 hydraulic failure.

Accordingly, the UBCM 14 and the DBCM 16 share hydraulic interfaces as well as the hydraulic fluid reservoir 18. As mentioned above, the reservoir 18 may be separate components or two chambers linked within one component. The example brake system 12 includes the two independent hydraulic circuits 22, 24, which each supply half of the wheel brakes 28. Both the hydraulic circuits 22, 24 operate through identical and separated systems within each of the UBCM 14 and the DBCM 16. Within or after the DBCM 16, each of the two circuits 22 and 24 supply one half of the wheel brakes 28. The two brake circuits 22,24 can be split between front and rear axles or crosswise with one wheel brake 28 being part of the front axle and another wheel brake in the same system being part of the rear axle.

In the case of any single point electrical or communication failures in one of the BCMs 14, 16 the other BCM 14, 16 is able to apply hydraulic brake pressure to the wheel brakes 28. In the case of any single point hydraulic failure, the other hydraulic circuit of the brake system 12 provides a redundant hydraulic circuit capable of applying hydraulic pressure to half of the wheel brakes 28 due to the independent hydraulic circuits 22, 24. At least one of the UBCM 14 and the DBCM 16 is capable to perform vehicle braking control functions such as anti-lock braking, traction control, electronic brake distributing, anti-rollover control and yaw control.

The disclosed brake system 12 is operable with or without a brake pedal or driver input switch (an example is an emergency braking switch). If a brake pedal (or other input device) is optionally installed, the example braking system 12 can work with or without a mechanical or hydraulic connection from the brake pedal to the wheel brakes. The brake system can use a brake pedal sensor or any analog or digital communication signal to command the amount of deceleration requested by the driver or other control device. In addition, or alternatively, the brake system 12 can operate autonomously without input from a vehicle operator.

Figure 2:
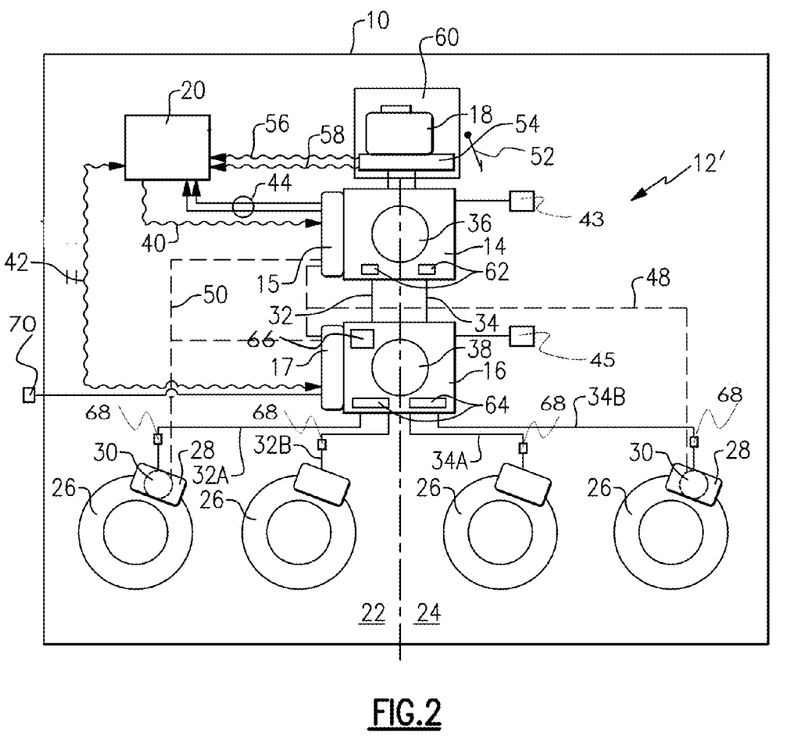
FIG. 2 is a schematic view of another vehicle braking system.

Referring to FIG. 2, another braking system 12' includes a driver actuated braking mechanism in the form of a traditional brake pedal 52 and master cylinder assembly 60. Brake pedal 52 and master cylinder assembly 60 translates driver input to hydraulic pressure in the first and second brake circuits 22, 24. A travel sensor 54 is provided for sensing the travel of the brake pedal 52 to provide a braking signal to the virtual driver 20 through data first and second data connections 56, 58. Each data connection corresponds with a separate one of the UBCM 14 and the DBCM 16 to provide a separate and redundant communications link. Although the pedal 52 is illustrated, the driver actuated braking mechanism can also be in the form of a button, or the like, that can be actuated by the driver or a vehicle occupant in vehicles where autonomous operation is performed such that the vehicle does not include a driver in the traditional understanding.

Figure 3:
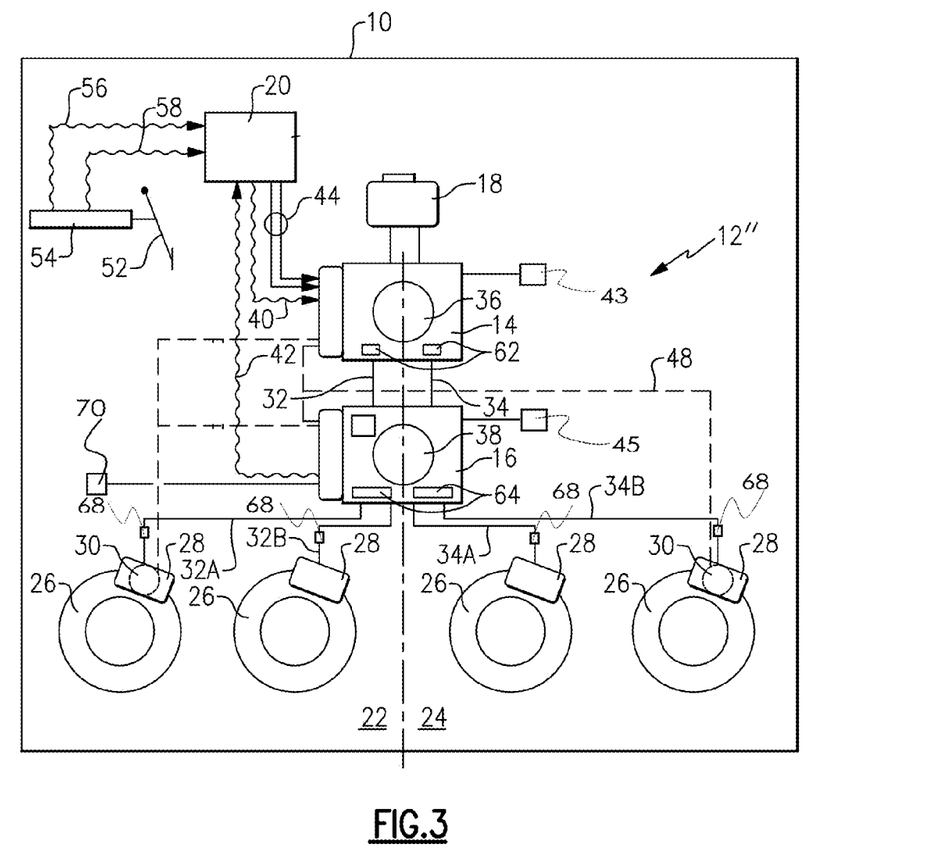
FIG. 3 is a schematic view of yet another example braking system.

Referring to FIG. 3, another brake system 12" includes the brake pedal 52 and travel sensor 54. The brake pedal 52 provides an input to the pedal travel sensor 54 that is communicated to the virtual driver 20 and utilized to determine a desired braking operation. The sensor 58 generates a signal indicative of the driver's input request and communicates this to the virtual driver 20 and brake system 12" through the data connections 56, 58. In this example, the brake pedal 52 and travel sensor 58 is independent of any hydraulic or mechanical coupling to the braking system 12" resulting in a braking "by-wire" configuration.

The disclosed braking systems 12' and 12" illustrated in FIGS. 2 and 3 include provision for driver actuated braking command in the form of a driver actuated braking mechanism, in either case, the deceleration or other braking request to the system may or may not come from the driver or other vehicle occupant, as the braking command can still come from the autonomous vehicle system.

Referring back to FIG. 1, a disclosed method for operating the braking system 12 includes receiving a braking signal to provide brake pressure at one or both of the UBCM 14, and DBCM 16. The signal may originate from the virtual driver 20 as a result of a determination made based on vehicle operation autonomous of driver input, or from driver input or a combination of driver input and autonomous operation. In response to receiving the braking signal, one or both of the corresponding pumps 36, 38 of the UBCM 14 and DBCM 16 are actuated. In response to actuating one or both of the pumps 36, 38, the hydraulic fluid contained in the reservoir 18 will exert a hydraulic pressure through the hydraulic brake lines 32, 34 of the brake circuits 22 and 24 through both the UBCM 14 and DBCM 16 and toward the wheel brakes 28.

In one disclosed embodiment, both the UBCM 14 and DBCM 16 receive the braking signal and both of the corresponding pumps 36, 38 are actuated. However, in the event of a fault at one of the BCMs 14 and 16, the series connection of the UBCM 14 and DBCM 16 provided by the plurality of valves 62, 64 and corresponding pumps 36, 38 will result in hydraulic fluid at a desired pressure being delivered through both of the hydraulic brake circuits 22 and 24.

In one disclosed embodiment, fluid pressure is communicated through both of the hydraulic brake circuits 22 and 24 such that all of the wheel brakes 28 are actuated. However, in the event of a hydraulic fluid leak, blockage, or other fault in one of the brake circuits 22, 24, the redundant configuration of the two brake circuits 22, 24 provides fluid pressure delivered through both the UBCM 14 and the DBCM 16 to half of the wheel brakes 28 disposed on the undamaged brake circuit.

For FIGS. 1-3 the two BCMs 14, 16 provide redundancy without the need for vacuum in the vehicle 10 (as used in conventional vacuum assisted power braking systems). For example, the braking system 12, 12', 12" can also use redundant pump motor coils in the hydraulic pumps and redundant control circuits or redundant ECUs to control pump circuits independently. In another example, the braking system 12, 12', 12" can use a plunger type pressure actuator as a primary hydraulic pressure source and a BCM for redundancy. In another example, the braking system 12 can use non-hydraulic brake actuators (i.e. electro-mechanical brake actuators, or "EMB") with two electrical circuits and two ECUs. In another example, the system 12, 12', 12" can use a combination of one hydraulic control and one non-hydraulic control with independent electrical circuits and ECUs. One skilled in the art would be able to modify the systems 12, 12', 12" to use one or more non-hydraulic brake actuators as the BCMs 14 or 16 to control the brake system 12, 12', 12".

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A brake system for a motor vehicle comprising:
a first brake set and second brake set;
a first hydraulic brake circuit connected to the first brake set;
a second hydraulic brake circuit hydraulically connected in series with the second brake set;
a first control module coupled to the first hydraulic brake circuit and the second hydraulic brake circuit, wherein the first control module is configured to control fluid pressure within both the first hydraulic brake circuit and the second hydraulic brake circuit; and
a second control module coupled to the first hydraulic brake circuit and the second hydraulic brake circuit, wherein the second control module is configured to control fluid pressure within both the first hydraulic brake circuit and the second hydraulic brake circuit independent of the first control module, wherein the first control module is disposed in series with the second control module in the first hydraulic brake circuit and the second hydraulic brake circuit;
a virtual driver, wherein the virtual driver sends a deceleration request to the first control module and the second control module, and wherein the first control module and the second control module determine a desired pressure based upon the deceleration request;
wherein the first brake control module controls fluid pressure within both the first hydraulic brake circuit and the second hydraulic brake circuit to perform the deceleration request; and
wherein the second control module monitors pressure downstream from the first control module and compares the monitored pressure to the desired pressure.

2. The brake system for a motor vehicle as recited in claim 1, wherein the second brake control module controls fluid pressure within both the first hydraulic brake circuit and the second hydraulic brake circuit to perform the deceleration request when the difference in the desired pressure and the monitored pressure is above a predetermined threshold.

3. The brake system for a motor vehicle as recited in claim 2, wherein the second brake control module informs the virtual driver when one of: the pressure difference is above the predetermined threshold, and the second brake control module detects a loss of redundancy with the first brake control module.

4. The brake system for a motor vehicle as recited in claim 1, each of the first brake set and the second brake set comprise a plurality of wheel brakes and wherein at least one of the wheel brakes includes an integrated parking brake electronically coupled to each of the first control module and the second control module such that the integrated parking brake is actuatable by both at least one of: the first control module and the second control module.

5. The brake system for a motor vehicle as recited in claim 1, wherein each of the first control module and the second control module include separate power and data inputs.

6. The brake system for a motor vehicle as recited in claim 1, wherein the second brake control module further monitors data from at least one of: longitudinal sensor and a wheel sensor and compares the monitored data to the deceleration request, and wherein the second brake control module controls fluid pressure within the first and the second hydraulic circuit to perform the deceleration request when at least one of: the difference in the deceleration request and the monitored data is above a predetermined threshold, and, and the second brake control module detects a loss of redundancy with the first brake control module.

7. The brake system for a motor vehicle as recited in claim 1, wherein the first control module is disposed in series with the second control module for only one of the first hydraulic brake circuit and the second hydraulic brake circuit.

8. A brake system for a motor vehicle comprising:
a first brake set and second brake set;
a first brake circuit connected to the first brake set;
a second brake circuit connected hydraulically in series with the second brake set;
a first control module coupled to the first brake circuit and the second brake circuit, wherein the first control module is configured to control both the first brake circuit and the second brake circuit; and
a second control module coupled to the first brake circuit and the second brake circuit, wherein the second control module is configured to control both the first brake circuit and the second brake circuit independent of the first control module, wherein the first control module is disposed in series with the second control module in the first brake circuit and the second brake circuit;
a virtual driver, wherein the virtual driver sends a deceleration request to the first control module and the second control module, and wherein the first control module and the second control module determine a desired braking pressure based upon the deceleration request;
wherein the first brake control module controls the first brake circuit and the second brake circuit to perform the deceleration request;
wherein the second control module monitors the performed deceleration from the first control module and compares the performed deceleration to the deceleration request; and
wherein the first control module and the second control module are each one of: a hydraulic control module and an electro-mechanical brake actuator.

9. The brake system for a motor vehicle as recited in claim 8, wherein the second brake control module informs the virtual driver when one of: the difference in the performed deceleration and the deceleration request is above a predetermined threshold, and the second brake control module detects a loss of redundancy with the first brake control module.

10. The brake system for a motor vehicle as recited in claim 8, each of the first brake set and the second brake set comprise a plurality of wheel brakes and wherein at least one of the wheel brakes includes an integrated parking brake electronically coupled to each of the first control module and the second control module such that the integrated parking brake is actuatable by both at least one of: the first control module and the second control module.

11. The brake system for a motor vehicle as recited in claim 8, wherein each of the first control module and the second control module include separate power and data inputs.

12. The brake system for a motor vehicle as recited in claim 8, wherein the second brake control module further monitors data from at least one of: longitudinal sensor and a wheel sensor and compares the monitored data to the deceleration request, and wherein the second brake control module controls the first and the second circuit to perform the deceleration request when at least one of: the difference in the deceleration request and the monitored data is above a predetermined threshold, and, and the second brake control module detects a loss of redundancy with the first brake control module.

13. The brake system for a motor vehicle as recited in claim 8, wherein the first control module is disposed in series with the second control module for only one of the first brake circuit and the second brake circuit.

14. A method of operating a vehicle braking system comprising:
   configuring a first control module coupled to control both a first brake circuit and a second brake circuit;
   configuring a second control module to be hydraulically connected in series with the first control module and configuring the second control module to control both the first brake circuit and the second brake circuit; and
   sending a deceleration request from a virtual driver to the first control module and the second control module;
   controlling both the first brake circuit and the second brake circuit with the first control module to performing the deceleration request;
   monitoring the performed deceleration request from the first control module with the second control module;
   comparing the performed deceleration request to the actual deceleration request with the second control module; and
   controlling both the first brake circuit and the second brake circuit with the second control module, when a difference in the performed deceleration request and the actual deceleration request is above a predetermined threshold.

15. The method as recited in claim 14, further comprising the second control module informing the virtual driver when one of: the difference in the performed deceleration request and the actual deceleration request is above the predetermined threshold, and the second brake control module detects a loss of redundancy with the first brake control module.

16. The method as recited in claim 14, wherein each of the first control module and the second control module include separate power and data inputs.

17. The method as recited in claim 14, further comprising:
   monitoring data from at least one of: a longitudinal sensor and a wheel sensor; comparing the monitored data to the deceleration request; and
   controlling fluid pressure with the second control module within both the first brake circuit and the second brake circuit, when a difference in the deceleration request and the monitored data is above a predetermined threshold.

18. The method as recited in claim 14, wherein the first control module is disposed in series with the second control module for only one of the first brake circuit and the second brake circuit.

19. The method as recited in claim 14, wherein the first control module and the second control module are each one of: a hydraulic control module and an electro-mechanical brake actuator.

* * * * *